Aug. 26, 1952     F. L. SHIPLEY     2,608,016
ADJUSTABLE DEPTH VANE FISH LURE
Filed Oct. 3, 1951
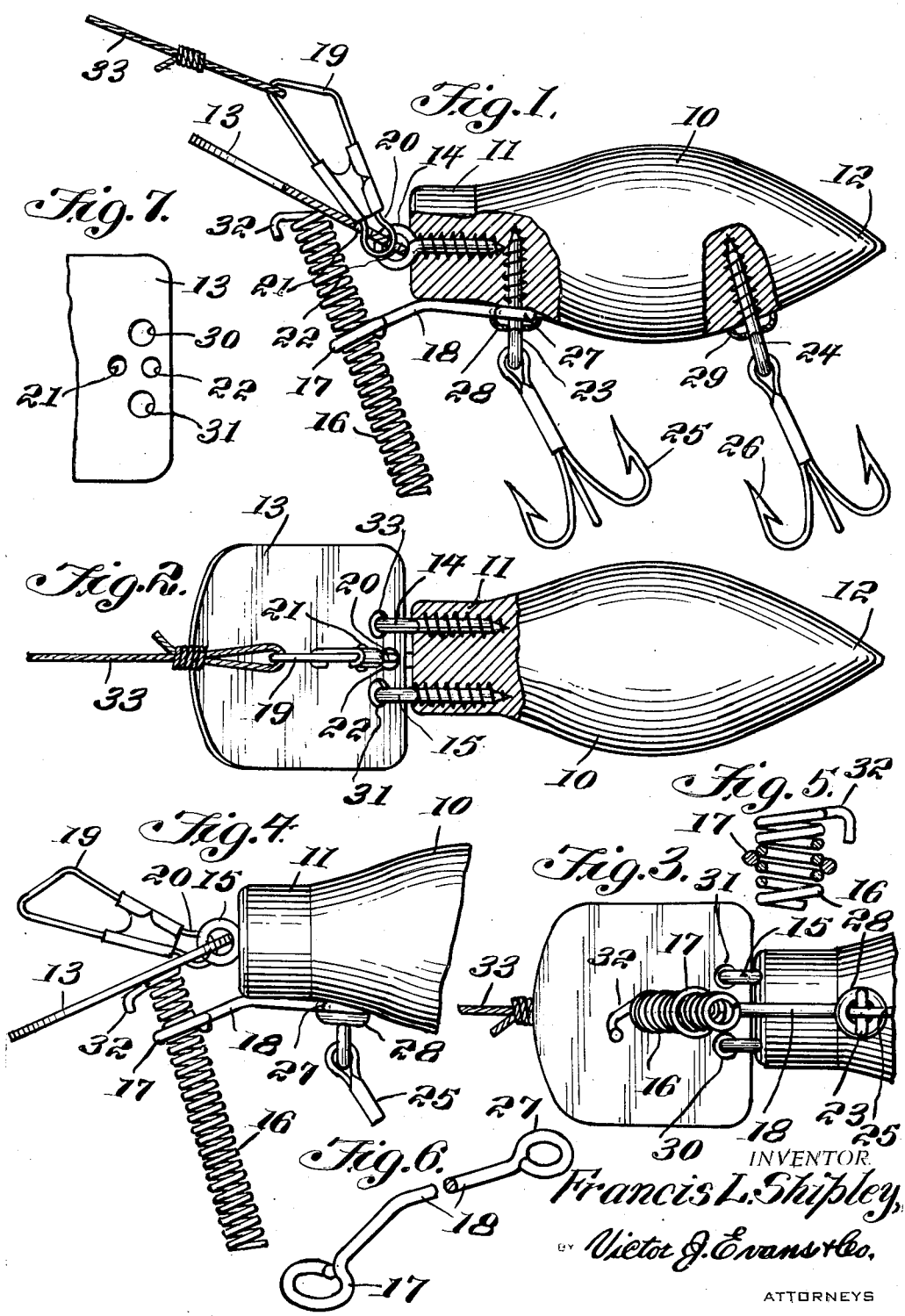
INVENTOR.
Francis L. Shipley,
BY Victor J. Evans & Co.
ATTORNEYS Patented Aug. 26, 1952

2,608,016

UNITED STATES PATENT OFFICE 2,608,016

ADJUSTABLE DEPTH VANE FISH LURE

Francis L. Shipley, Blanchard, Okla.

Application October 3, 1951, Serial No. 249,509

5 Claims. (Cl. 43—42.22)

This invention relates to fish lures of the plug type in which hooks depend from a solid body, and in particular a body having a generally horizontally disposed vane attached to the forward end with a pair of screw eyes, with a line attaching clevis extended upwardly from the trailing edge of the vane and with the vane retained in adjusted positions with a spring screw threaded through an eye mounted on the lower side of the body.

The purpose of this invention is to provide a fish lure in which the elevation of the lure in the water is adjustable by a vane hinged to the forward end and resiliently held by a spring screw.

Various devices have been provided for adjusting the position of elevators or vanes on fishing plugs and lures, however, it is difficult to provide means for retaining a vane in adjusted positions without adding screws, bolts and other metal parts. With this thought in mind this invention contemplates a spring screw threaded through an eye mounted on the lower side of a fish lure with a generally horizontally disposed vane hinged to the forward end of the lure and retained in adjusted positions by the spring screw.

The object of this invention is, therefore, to provide means in a fish lure for readily adjusting a horizontally disposed depth gauge or vane whereby resiliency is provided between the adjusting means and vane.

Another object of the invention is to provide an improved fish lure having a depth vane adjustably mounted thereon and having a clevis, or snap extended upwardly from the forward end of the lure for attaching the lure to a fishing line.

A further object of the invention is to provide an improved fish lure having an adjustable horizontally disposed vane on the forward end and an upwardly extended line attaching clevis also on the forward end, in which the lure is of a simple and economical construction.

With these and other objects and advantages in view the invention embodies a fishing lure in the form of a plug having tapering ends with fish hooks attached to the plug with screw eyes, with a horizontally disposed depth vane secured to the forward end of the plug by a pair of screw eyes, with a line attaching clevis extending upwardly from the plug, and with a spring screw threaded through an eye extended forwardly from the plug and positioned to engage the depth vane for readily adjusting the position of the vane.

Other features and advantages of the invention will appear from the following description taken in connection with the drawings wherein:

Figure 1 is a side elevational view showing the improved fish lure with parts broken away and shown in section.

Figure 2 is a plan view of the lure also with parts broken away and shown in section.

Figure 3 is a detail looking upwardly toward the under surface of the forward end of the body of the lure showing the depth vane and the spring screw for adjusting the position of the vane.

Figure 4 is a side elevational view similar to that shown in Figure 1 showing the leading end of the lure and illustrating the parts with the depth vane extending downwardly.

Figure 5 is a detail showing the upper end of the spring screw with the spring screw positioned in a mounting eye and with parts broken away and shown in section.

Figure 6 is a detail illustrating the spring screw mounting eye for attaching the spring screw to the under side of the body of the lure.

Figure 7 is a detail showing a plan view of a trailing edge of the vane illustrating the positions of the openings through the vane.

Referring now to the drawing wherein like reference characters denote corresponding parts the improved fish lure of this invention includes a streamlined substantially bulbular body 10 in which the leading end tapers to a cylindrical section 11 and the trailing end to a conical section or point 12, a generally horizontally disposed vane 13 secured to the body by screw eyes 14 and 15, a spring screw 16 threaded through an eye 17 of a bar 18 and a line attaching clevis 19 which is mounted on the trailing edge of the vane 13 with a spring clip 20 which extends through openings 21 and 22 in the vane.

The lower side of the body 10 is provided with screw eyes 23 and 24 from which hooks 25 and 26 respectively, depend and, as shown in Figure 1 the screw eye 23 extends through an eye 27 of the bar 18 on the opposite end of which the eye 17 is positioned, the screw eye 23 providing means for mounting the bar 18 on the body of the lure. The screw eyes 23 and 24 are provided with washers 28 and 29, respectively which form tensioning means for securing the screw eyes in position in the lure.

The screw eyes 14 and 15 extend through openings 30 and 31, respectively in the trailing edge of the vane 13 thereby providing means for hinging the vane to the body of the lure.

The upper end of the spring screw 16 is provided with an extended section 32 to prevent the spring screw dropping through the eye 17 in adjusting the position thereof and with the upper end of the spring screw engaging the lower surface of the vane 13 the position of the vane is readily adjustable from an upwardly extended position as shown in Figure 1 to a downwardly disposed position as shown in Figure 4 and to intermediate positions.

The position of the vane 13 determines the depth to which the lure travels through the water as it is drawn by fishing line 33 attached to the clevis 19 and with the adjusting means provided in this manner the elevation of the lure or depth thereof in the water is accurately determined.

The movement of the diving or depth vane in the two attaching screw eyes and also the movement in compressing the spring screw with variations in speed of the lure through the water adds to the action of the lure. The comparatively high point of attachment of the fishing line permits the water pressure to hold the vane against the spring screw.

The eye 17 at the end of the bar 18 is formed in a spiral to correspond with the coils of the spring screw whereby the spring screw is frictionally held and remains in position in the eye until manually actuated.

The spring screw, which extends downwardly from the eye 17 is positioned ahead of the hook so that it provides protecting means to prevent snagging of the lure on roots, weeds, rocks and the like thereby making fishing possible in water containing weeds, brush, rocks and the like.

It will be understood that modifications may be made in the design and arrangement of the parts without departing from the spirit of the invention.

What is claimed is:

1. A fishing lure comprising an elongated body, hooks depending from said body, a pair of screw eyes positioned in a horizontal plane extended from the forward end of the body, a generally horizontally disposed vane mounted by said pair of screw eyes on the body, an eye extended forwardly from the under surface of the body, a screw threaded in said forwardly extended eye and positioned to engage the under surface of said vane for adjusting the position of the vane, and a line attaching clevis extended upwardly from said lure.

2. A fishing lure as described in claim 1 wherein the screw threaded in the forwardly extended eye for adjusting the vein is a spring screw comprising a coil of spring wire.

3. A fishing lure as described in claim 1 wherein the body is bulbular shape with tapering ends, with the forward end tapering to a cylindrical section and with the trailing end tapering to a point.

4. In a fish lure, the combination which comprises a plug having a body regular in cross section and having an enlarged center section with tapering ends, screw eyes threaded into the under surface of the body and having fish hooks depending therefrom, a pair of screw eyes threaded into the forward end of the body and positioned in a horizontal plane, a vane having openings in the trailing edge mounted on said pair of screw eyes with the eyes extended through openings in the trailing edge, a line attaching clevis freely mounted in and extended upwardly from the trailing edge of the vane, a bar having eyes on the ends extended from the under surface of the body with the eye in one end secured in position by one of the hook mounting screw eyes, and a spring screw threaded through the eye on the opposite end of the bar which is extended from the under surface of the body and positioned to engage the under surface of the vane.

5. A fishing lure as described in claim 4 wherein the eye on the extended end of the bar positioned on the under surface of the body is in the form of a spiral to correspond with the coils of the spring screw and an extended section is provided on the spring screw to prevent accidental removal of the screw from the said eye on the end of the bar extended from the under surface of the body.

FRANCIS L. SHIPLEY.

No references cited.